(12) United States Patent
Kuehner et al.

(10) Patent No.: US 11,486,744 B1
(45) Date of Patent: Nov. 1, 2022

(54) VALVE BASED DEFORMABLE SENSOR HAVING RIGIDITY ADJUSTMENT CAPABILITY

(71) Applicant: TOYOTA RESEARCH INSTITUTE, INC., Los Altos, CA (US)

(72) Inventors: Manuel L. Kuehner, Mountain View, CA (US); Hiroshi Yasuda, San Francisco, CA (US)

(73) Assignee: TOYOTA RESEARCH INSTITUTE, INC., Los Altos, CA (US)

( * ) Notice: Subject to any disclaimer, the term of this patent is extended or adjusted under 35 U.S.C. 154(b) by 0 days.

(21) Appl. No.: 17/407,864

(22) Filed: Aug. 20, 2021

(51) Int. Cl.
*G01D 11/24* (2006.01)

(52) U.S. Cl.
CPC .................... *G01D 11/245* (2013.01)

(58) Field of Classification Search
CPC ............................ G01D 11/24; G01D 11/245
See application file for complete search history.

(56) References Cited

U.S. PATENT DOCUMENTS

| 10,871,860 | B1 | 12/2020 | Bushnell et al. | |
|---|---|---|---|---|
| 2016/0187982 | A1* | 6/2016 | Ciesla | G06F 3/016 345/173 |
| 2021/0252721 | A1* | 8/2021 | Alspach | B25J 15/12 |

FOREIGN PATENT DOCUMENTS

| CN | 102106159 A | 6/2011 |
|---|---|---|
| CN | 106644183 A | 5/2017 |
| CN | 110987246 A | 4/2020 |
| WO | 2016063163 A1 | 4/2016 |

OTHER PUBLICATIONS

Alex Alspach; "Soft-Bubble: a Highly Compliant Dense Geometry Tactile Sensor for Robot Manipulation"; (https://arxiv.org/ftp/arxiv/papers/1904/1904.02252.pdf); 8 pgs.; Apr. 3, 2019.
Sihah Joonhigh; "Variable Compliance and Geometry Regulation of Soft-Bubble Grippers With Active Pressure Control"; (https://arxiv.org/pdf/2103.08710.pdf); 7 pgs.; Mar. 15, 2021.

* cited by examiner

*Primary Examiner* — Jamel E Williams
(74) *Attorney, Agent, or Firm* — Dinsmore & Shohl LLP

(57) ABSTRACT

A deformable sensor is provided. The deformable sensor includes a first deformable member defining a first cavity configured to be filled with a medium, a second deformable member defining a second cavity, a rigid component disposed between the first deformable member and the second deformable member such that the first deformable member is positioned on a first portion of the rigid component and the second deformable member is positioned on a second portion of the rigid component, the rigid component including an aperture disposed thereon, and a valve member configured to fluidly couple the first cavity of the first deformable member to the second cavity of the second deformable member via the aperture. The first deformable member has a first rigidity value when the valve member is configured in a first orientation, and a second rigidity value when the valve member is configured in the second orientation.

20 Claims, 7 Drawing Sheets

VALVE BASED DEFORMABLE SENSOR HAVING RIGIDITY ADJUSTMENT CAPABILITY

TECHNICAL FIELD

The present specification relates to deformable sensors, and more specifically, to deformable sensors including multiple deformable members positioned on various portions thereon that are fluidly coupled to one another via valves.

BACKGROUND

One or more deformable sensors may be positioned on one or more portions of various devices, e.g., robots, robotic arms, etc. These sensors may be configured to detect contact with an object and enable the determination of shapes and dimensions of the object based the object contacting one or more portions of the deformable members. The rigidity of the deformable members may impact the ability of the deformable sensors to accurately determine the shape and dimensions of various objects, and as such, a system that enables engineers, designers, and others to control the rigidity of these members, in real time, may add to the versatility of and improve the object detection capability and mechanical contact establishing capability of these sensors.

Accordingly, a need exists for a deformable sensor system that may be configured to adjust rigidity levels of one or more deformable members in real time.

SUMMARY

In one embodiment, a deformable sensor including multiple fluidly coupled deformable members is provided. The deformable sensor comprises a first deformable member defining a first cavity configured to be filled with a medium, a second deformable member defining a second cavity, a rigid component disposed between the first deformable member and the second deformable member such that the first deformable member is positioned on a first portion of the rigid component and the second deformable member is positioned on a second portion of the rigid component, the rigid component including an aperture disposed thereon, and a valve member configured to fluidly couple the first cavity of the first deformable member to the second cavity of the second deformable member via the aperture, the valve member configurable in a first orientation and a second orientation. The first deformable member has a first rigidity value when the valve member is configured in a first orientation and a second rigidity value when the valve member is configured in the second orientation. The second rigidity value is based on a part of the medium dispersing from the first deformable member to the second deformable member responsive to the valve member being configured in the second orientation.

In another embodiment, a deformable sensor including multiple fluidly coupled deformable members is provided. The deformable sensor includes a first deformable member defining a first cavity configured to be filled with a medium, a second deformable member defining a second cavity, a third deformable member defining a third cavity, a rigid component disposed such that the first deformable member is positioned on a first portion of the rigid component, the second deformable member is positioned on a second portion of the rigid component, and the third deformable member is positioned on a third portion of the rigid component, the rigid component including an aperture and an additional aperture disposed thereon, a valve member configured to fluidly couple the first cavity of the first deformable member to the second cavity of the second deformable member via the aperture, the valve member configurable in a first orientation and a second orientation, and an additional valve member configured to fluidly couple the first cavity of the first deformable member to the third cavity of the third deformable member via the additional aperture, the additional valve member configurable in the first orientation and the second orientation. The first deformable member has a first rigidity value when the valve member is configured in the first orientation and a second rigidity value when the valve member is configured in the second orientation, the second rigidity value is based on a part of the medium dispersing from the first cavity of the first deformable member to the second cavity of the second deformable member. The first deformable member has a third rigidity value when the additional valve member is configured in the second orientation. The third rigidity value is based on an additional part of the medium dispersing from the first cavity of the first deformable member to the third cavity of the third deformable member.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
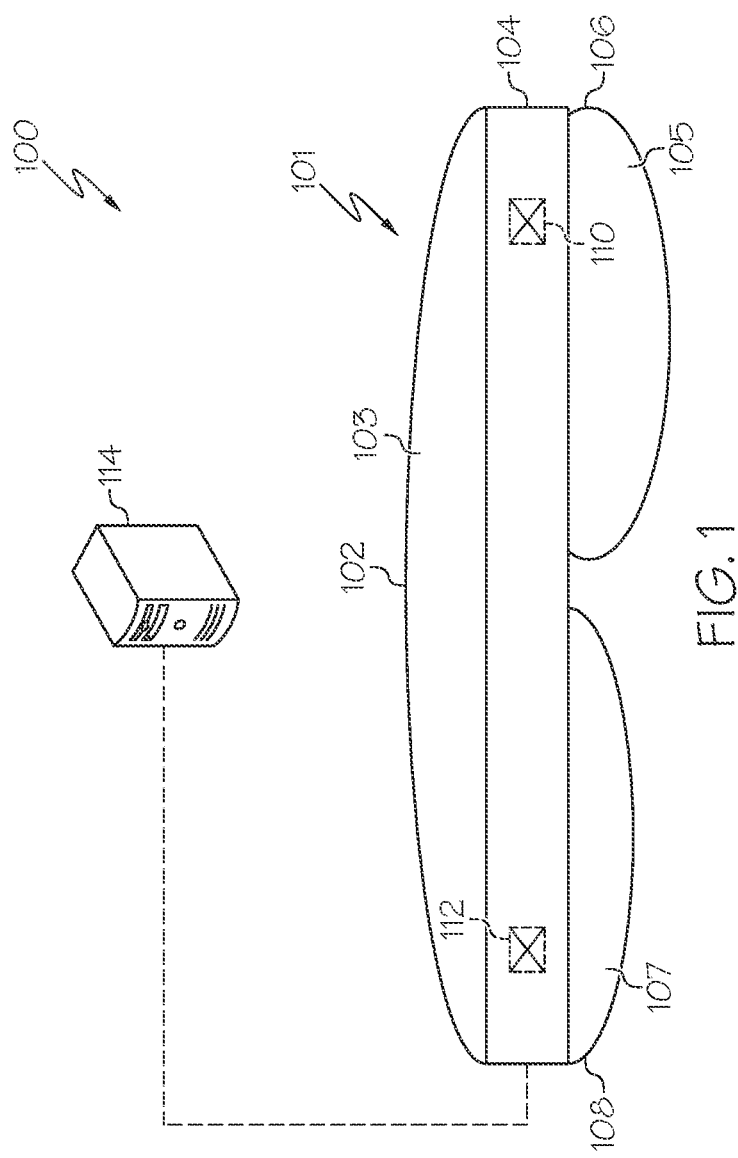
FIG. 1 depicts an example deformable sensor rigidity control system of the present disclosure, according to one or more embodiments described and illustrated herein.

Deformable sensors may be positioned on portions of various autonomous and manually controlled robots. Additional information regarding deformable sensors is provided in U.S. Pat. Nos. 10,549,428, 10,668,627, and 11,007,652, which are hereby incorporated by reference in their entireties. These deformable sensors may be positioned on portions of a robot that may interact with objects of various sizes and dimensions that are external to the robot. In embodiments, these deformable sensors may include cameras, time of flight sensors, and other comparable components that determine the shape and dimensions of, e.g., objects that contact these sensors. Specifically, when an object contacts an outer surface of a deformable sensor, the sensor may experience a deformation corresponding to a particular shape and dimension, which is based on the rigidity level of the object. The deformation may be detected and captured using, e.g., a camera embedded within the sensor and a high resolution depth image of the deformation may be generated. However, in order to enable the deformable sensor to accurately detect shapes and dimensions of external objects, controlling, in real time, the rigidity level of various deformable members positioned on the deformable sensor, prior to runtime of the deformable sensor, becomes a challenge. To modify the rigidity level in this way, current techniques require, e.g., replacing existing deformable members with other deformable members that have a higher or lower rigidity level, manually adjusting the pressure of the deformable members on sensors, or altogether replacing the sensor.

The deformable sensor rigidity control system of the present disclosure addresses and overcomes the above mentioned deficiencies. The deformable sensor rigidity control system includes a deformable sensor that may be communicatively coupled to one or more computing devices. In embodiments, the deformable sensor may include a first deformable member, at least a second deformable member, and a rigid component such that the first deformable member may be positioned on a surface of the rigid component and the second deformable member may be positioned on another surface of the rigid component. Cavities defined by the first and second deformable members may be fluidly coupled to each other via valves components that may be positioned in apertures on the rigid component. In embodiments, the valve components may be configured to operate in a closed operation status and an open operation status and serve to fluidly couple the first and second cavities defined by the first and second deformable members, respectively. Additionally, when the valve is positioned in an open operation status, medium present within the first deformable member may disperse from a first cavity defined by this member to the second cavity defined by the second deformable member. In embodiments, the medium may be air. A higher volume of air may be present in the first deformable member relative to the second deformable member. As a result of air dispersal from the first cavity defined by the first deformable member to the second cavity defined by the second deformable member, the rigidity level of the first member may be reduced. In this way, the rigidity level of deformable members positioned on deformable sensors may be controlled, in real time and prior to run-time.

FIG. 1 depicts an example of a deformable sensor rigidity control system 100 of the present disclosure, according to one or more embodiments described and illustrated herein. Specifically, the deformable sensor rigidity control system 100, as depicted in FIG. 1, includes a deformable sensor 101 that is communicatively coupled to a computing device 114 via a wired connection. It is noted that the deformable sensor 101 may be communicatively coupled to the computing device 114 wirelessly, e.g., via a communication network. In embodiments, the deformable sensor 101 may include a first deformable member 102, a second deformable member 106 and a third deformable member 108. These members may be positioned on the deformable sensor 101 such that the first deformable member 102 may be positioned on a top surface of a rigid component 104, while the second deformable member 106 and the third deformable member 108 may be positioned on a bottom surface of the rigid component 104. Other positions for the deformable members are also contemplated. In other embodiments, another example design of the deformable sensor 101 may include only the first deformable member 102 and another deformable member having larger volume (e.g., size) than the second deformable member 106 (i.e., only two deformable members in total).

While each of the deformable members are shown to have the shape of a semi-circle, these members may be designed to have other shapes as well. Each of the deformable members may define a cavity that may be filled with a particular medium, e.g., air. Alternatively, the cavities defined by these members may be filled with another medium, e.g., water, gel, etc. In an example design of the deformable sensor 101, as illustrated in FIG. 1, the rigid component 104 that is disposed in between the first deformable member 102 and each of the second deformable member 106 and the third deformable member 108. The rigid component 104 may include a valve member 110 and an additional valve member 112 on two different parts of the rigid component 104. Specifically, the valve member 110 and the additional valve member 112 may be attached to or associated with an aperture and an additional aperture, respectively. Both the aperture and the additional aperture may be disposed on the rigid component 104. In operation, the valve member 110 and the additional valve member 112 are configured to fluidly couple the cavities defined by the respective deformable members and facilitate a transfer or dispersal of air from one cavity defined by a deformable member to another cavity defined by another member. In embodiments, after the dispersal of air from one member to another (via the cavities), air may be input into a deformable member from another deformable member via use of a mechanical component, e.g., such as a small pump. Specifically, the small pump may input air back from one or both of the second deformable member 106 and the third deformable member 108 to the first deformable member 102, e.g., via their respective cavities that are fluidly coupled.

The valve member 110 and the additional valve member 112 are both illustrated with a cross symbol, which denotes a closed positioned. In such a position, the volume of the respectively mediums within each of the first deformable member 102, the second deformable member 106, and the third deformable member 108 is maintained at a particular level. In other words, in a closed position or orientation, there is no transfer of any part of the medium from a cavity defined by a deformable member to another cavity defined by another deformable member. In contrast, if the valve member 110 is configured in an open position, a part of the medium (e.g., air) present in the first deformable member 102 may disperse, via a first cavity 103 defined by the first deformable member 102 to the second cavity 105 defined by the second deformable member 106. If the additional valve member 112 is configured in an open position, a part of the medium (e.g., air) present in the first deformable member 102 may disperse from the first cavity 103 defined by the first deformable member 102 to the third cavity 107 defined by the third deformable member 108. It is noted that the factors that contribute to a rigidity level of each of the first deformable member 102, the second deformable member 106, and the third deformable member 108 include a rigidity property of the material with which the deformable member is formed and the volume of the medium present within each of the first deformable member 102, the second deformable member 106, and the third deformable member 108.

In embodiments, the deformable sensor 101 may be designed such that the first deformable member 102 may have a size or volume that is larger the volume of the second deformable member 106. Additionally, the second deformable member 106 may have a volume that is larger than the third deformable member 108. Each of the first deformable member 102, the second deformable member 106, and the third deformable member 108 may be composed of the same material. Alternatively, each of the first deformable member 102, the second deformable member 106, and the third deformable member 108 may be composed of entirely different materials, having varying levels of rigidity.

In embodiments, the first deformable member 102 is an active portion of the deformable sensor 101. In particular, the first deformable member 102 is the portion of the deformable sensor 101 that will contact one or more external objects. In embodiments, the first deformable member 102 may, upon contacting one or more external objects, experience a deformation that may be captured by one or more cameras and/or time of flight sensors embedded or positioned within the first deformable member 102.

Figure 2A:
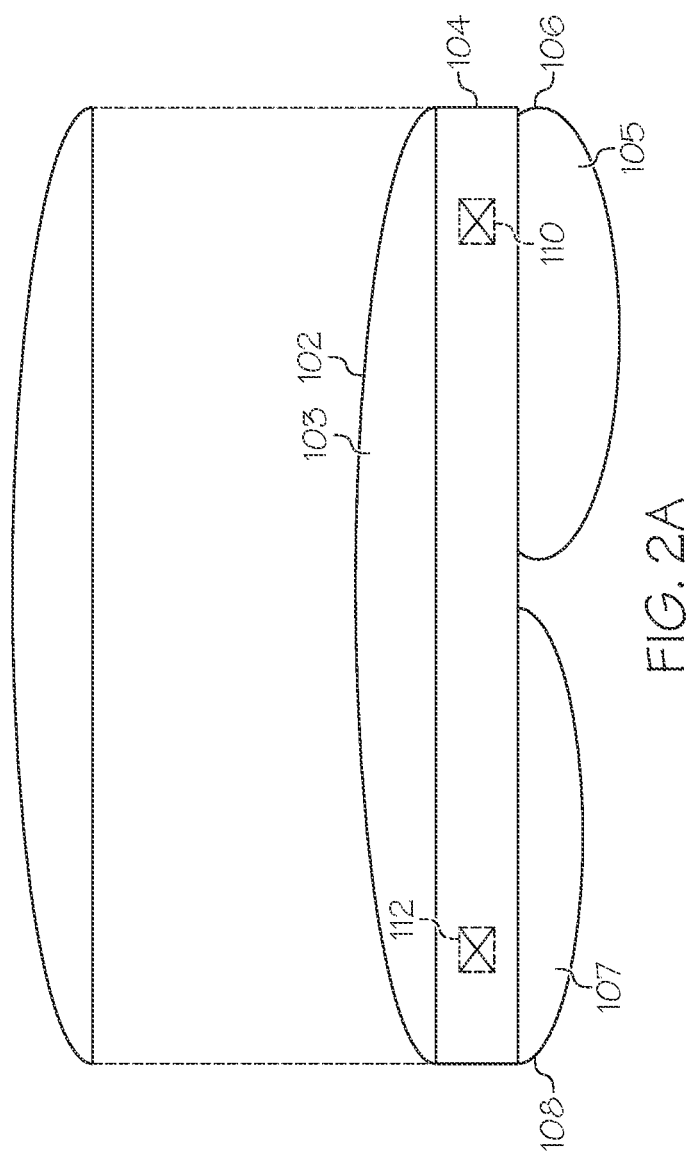
FIG. 2A depicts an expanded view of the shape and orientation of the first deformable member in an example operation of the deformable sensor rigidity control system of the present disclosure, according to one or more embodiments described and illustrated herein.

FIG. 2A depicts an expanded view of the shape and orientation of the first deformable member 102 in an example operation of the deformable sensor rigidity control system 100 of the present disclosure, according to one or more embodiments described and illustrated herein. Specifically, in FIG. 2A, a first deformable member 102 may include a medium, e.g., in the form of air. A certain volume of the medium may be included within a first cavity 103 of the first deformable member 102, which provides the first deformable member 102 with a certain rigidity level. Additionally, as shown in FIG. 2A and in FIG. 1, the valve member 110 and the additional valve member 112 are illustrated in a closed position, which ensures that the rigidity level of the first deformable member 102 is maintained at a particular level. In other words, no amount of the medium is dispersed from the first cavity 103 defined by the first deformable member 102 to either the second cavity 105 or the third cavity 107 defined by the second deformable member 106 and the third deformable member 108, respectively.

The first deformable member 102 is shown in a fully expanded position with, e.g., a maximum amount of air (or other medium) included within the member. Additionally, while the shape of the first deformable member 102 is shown in the form of a semi-circle, this member may be designed to have other shapes and dimensions as well. A volume of air within a deformable member corresponds to a pressure level within the deformable member and the volume of air and a composition of the deformable member, in combination, contribute to an overall rigidity level of the deformable member.

Figure 2B:
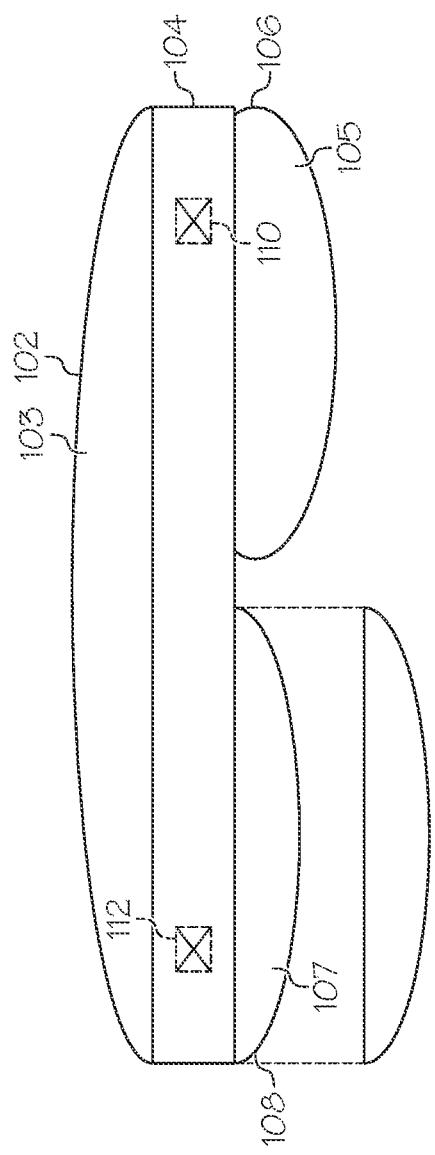
FIG. 2B depicts an expanded view of the shape and orientation of the third deformable member in an example operation of the deformable sensor rigidity control system of the present disclosure, according to one or more embodiments described and illustrated herein.

FIG. 2B depicts an expanded view of the shape and orientation of the third deformable member 108 in an example operation of the deformable sensor rigidity control system 100 of the present disclosure, according to one or more embodiments described and illustrated herein. Specifically, in FIG. 2B, a third deformable member 108 may include a certain volume of a medium, which may include a volume of air that is different than the volume of air present in the first deformable member 102. It is noted that, in embodiments, the volume of the medium present in the third deformable member 108 may be very low or non-existent. As such, in embodiments, the primary or sole factor contributing to the rigidity of the third deformable member 108 is the rigidity of the material of which the third deformable member 108 is composed.

Figure 2C:
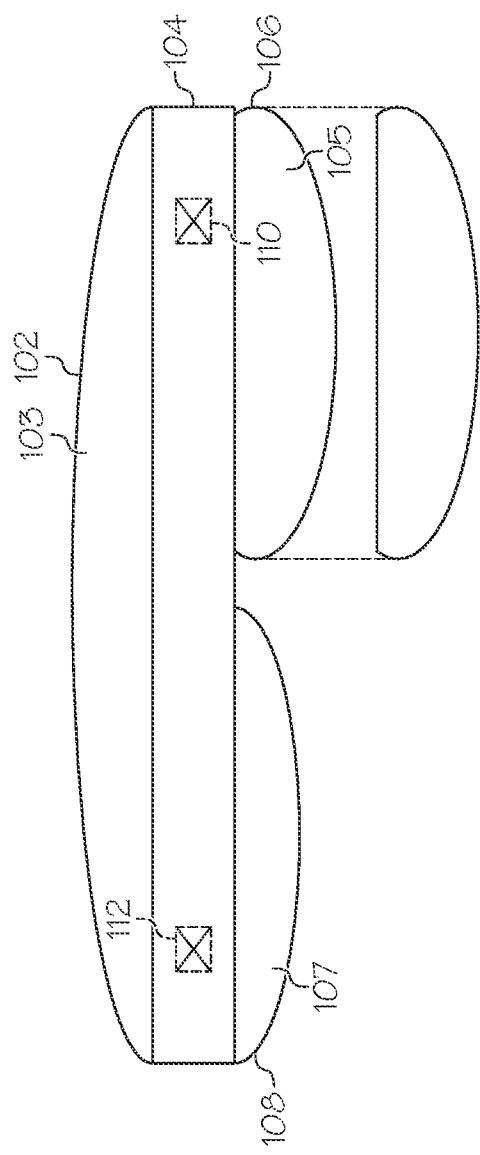
FIG. 2C depicts an expanded view of the shape and orientation of the second deformable member in an example operation of the deformable sensor rigidity control system of the present disclosure, according to one or more embodiments described and illustrated herein.

FIG. 2C depicts an expanded view of the shape and orientation of the second deformable member 106 in an example operation of the deformable sensor rigidity control system 100 of the present disclosure, according to one or more embodiments described and illustrated herein. Specifically, in FIG. 2B, a second deformable member 106 may include a certain volume of a medium, which may include a volume of air that is different than the volume of air present in the first deformable member 102. It is noted that, in embodiments, the volume of the medium present in the second deformable member 106 may be very low or non-existent. As such, in embodiments, the primarily or sole factor contributing to the rigidity of the second deformable member 106 is the rigidity of the material of which the second deformable member 106 is composed.

Figure 3A:
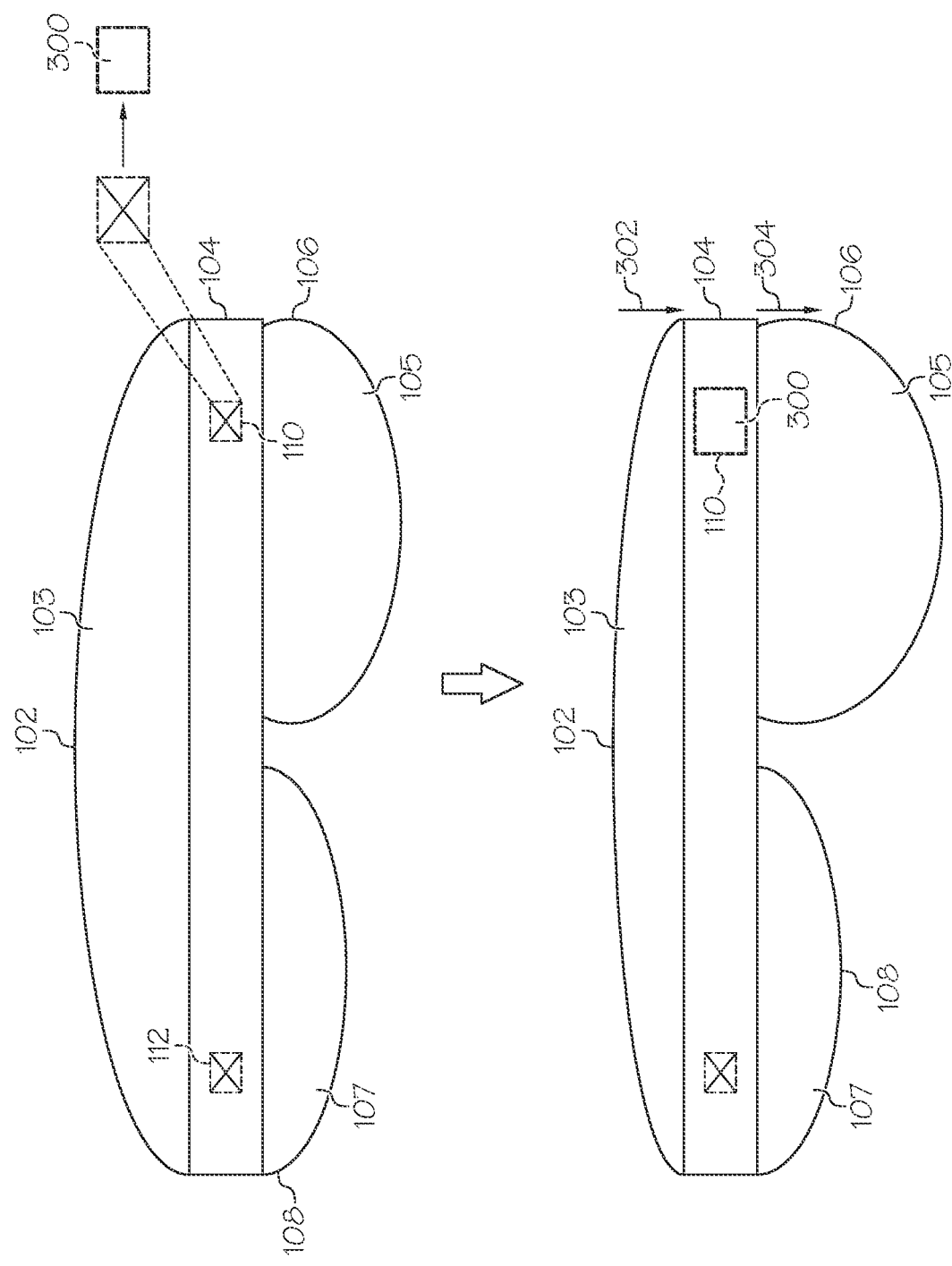
FIG. 3A depicts an example operation of the deformable sensor rigidity control system in which a position or orientation of a valve member is altered and an example result of the operation of the deformable sensor rigidity control system in which an operation status of the valve member is altered, according to one or more embodiments described and illustrated here.

FIG. 3A depicts an example operation of the deformable sensor rigidity control system 100 in which a position or orientation of the valve member 110 is altered, according to one or more embodiments described and illustrated here.

FIG. 3A depicts an example operation of the deformable sensor rigidity control system 100 in which a position or orientation of a valve member 110 is altered and an example result of the operation of the deformable sensor rigidity control system 100 in which an operation status of the a valve member 110 is altered, according to one or more embodiments described and illustrated here. Specifically, in FIG. 3A, a position or orientation of the valve member 110 is altered from a closed position to an open position 300. In embodiments, the computing device 114 may be communicatively coupled to the deformable sensor 101 such that the computing device 114 may communicate instructions to the deformable sensor 101 so as to control the operation status of the valve member 110, e.g., change an operation status from a closed position to the open position 300. Additionally, due to fluid coupling between the cavities of the first deformable member 102 and the second deformable member 106, a certain volume of the medium in the first deformable member 102 may disperse from the first cavity 103 defined by the first deformable member 102 to the second cavity 105 defined by the second deformable member 106, thereby resulting in a reduction in the pressure within the first deformable member 102. It is also noted that the status of the valve member 110 may be altered manually.

In this way, a rigidity level of the first deformable member 102 may be altered, in real time. It is noted that the first cavity 103 defined by first deformable member 102 is fluidly coupled to the second cavity 105 defined by the second deformable member 106 via, e.g., a valve component that may be positioned with an aperture disposed on the rigid component 104. In embodiments, the valve component may be manually moved from one position to another relative to the aperture. Alternatively, in another embodiment, the valve component may be moved automatically moved from one position to another relative to the aperture, e.g., based on instructions received from the computing device 114. The variation in the rigidity level of the first deformable member 102 may be based on the size and other properties of the one or more deformable members positioned on the rigid component 104.

For example, in one embodiment, the second deformable member 106 may be a quarter of the size of the first deformable member 102. The second cavity 105 defined by the second deformable member 106 may receive air and expand until it reaches a threshold level (e.g., a maximum expansion size of the second deformable member 106). Consequently, the rigidity level of the first deformable member 102 (e.g., a first rigidity value) may be reduced by a certain percentage, e.g., 20%, 25%, 30%, etc., thereby resulting in a new rigidity level for the first deformable member 102 (e.g., a second rigidity value). The second rigidity value may be lower than the first rigidity value. Alternatively, in order to reduce the rigidity level of the first deformable member 102 by a larger percentage, the size or volume of the second deformable member 106 may be increased or the material with which the second deformable member 106 is formed may be changed. For example, if the second deformable member 106 is formed of a material having a low level of malleability or ductility, the volume of air needed to expand this material may be higher, which results in a larger reduction in the rigidity level of the first deformable member 102, e.g., 35%, 40%, etc., after air from the first cavity 103 defined by the first deformable member 102 disperses from this cavity to the second cavity 105 defined by the second deformable member 106.

In other embodiments, a volume of the second deformable member 106 may be altered in order to reduce the rigidity level of the first deformable member 102 by a larger percentage. For example, if the volume of the second deformable member 106 is increased such that, the second deformable member 106 is one half the size of the first deformable member 102, as opposed to one quarter of the size of the first deformable member 102 as described above, the total amount of air needed to expand the second deformable member 106 may be higher.

Additionally, in embodiments, as a result of the change in the position or orientation of the valve member 110 from a closed position to the open position 300, the size of the first deformable member 102 may be reduced by a level 302 and the size of the second deformable member 106 may be expanded by a level 304. It is noted that a part of the medium present within the first deformable member 102 disperses from the first cavity 103 defined by the first deformable member 102 to the second cavity 105 defined by second deformable member 106 via an aperture positioned on the rigid component 104.

In an example operation, in an closed position of the valve member 110 (e.g., closed operation status), the aperture may be sealed or plugged (e.g., by a valve component) and may fail to facilitate any dispersal of air between the first cavity 103 and the second cavity 105 defined by the first deformable member 102 and the second deformable member 106, respectively. In contrast, in the open position 300 of the valve member 110 (e.g., open operation status), the aperture is not sealed or plugged, and as such, a part of the medium present in the first deformable member 102 disperses from the first cavity 103 to the second cavity 105 defined by the second deformable member 106. Specifically, a displacement in the position of a valve component as part of the valve member 110, which fluidly couples the first cavity 103 with the second cavity 105, enables air present in the first deformable member 102 to travel, from the first cavity 103 to the second cavity 105. The dispersed medium results in an expansion of the second deformable member 106 and causes a reduction in the rigidity level of the first deformable member 102 by, e.g., 20%, 25%, 30%, etc. It is noted that the rigidity level of the first deformable member 102 may vary depending on the material composition and/or dimensions of the first deformable member 102 and the second deformable member 106.

Figure 3B:
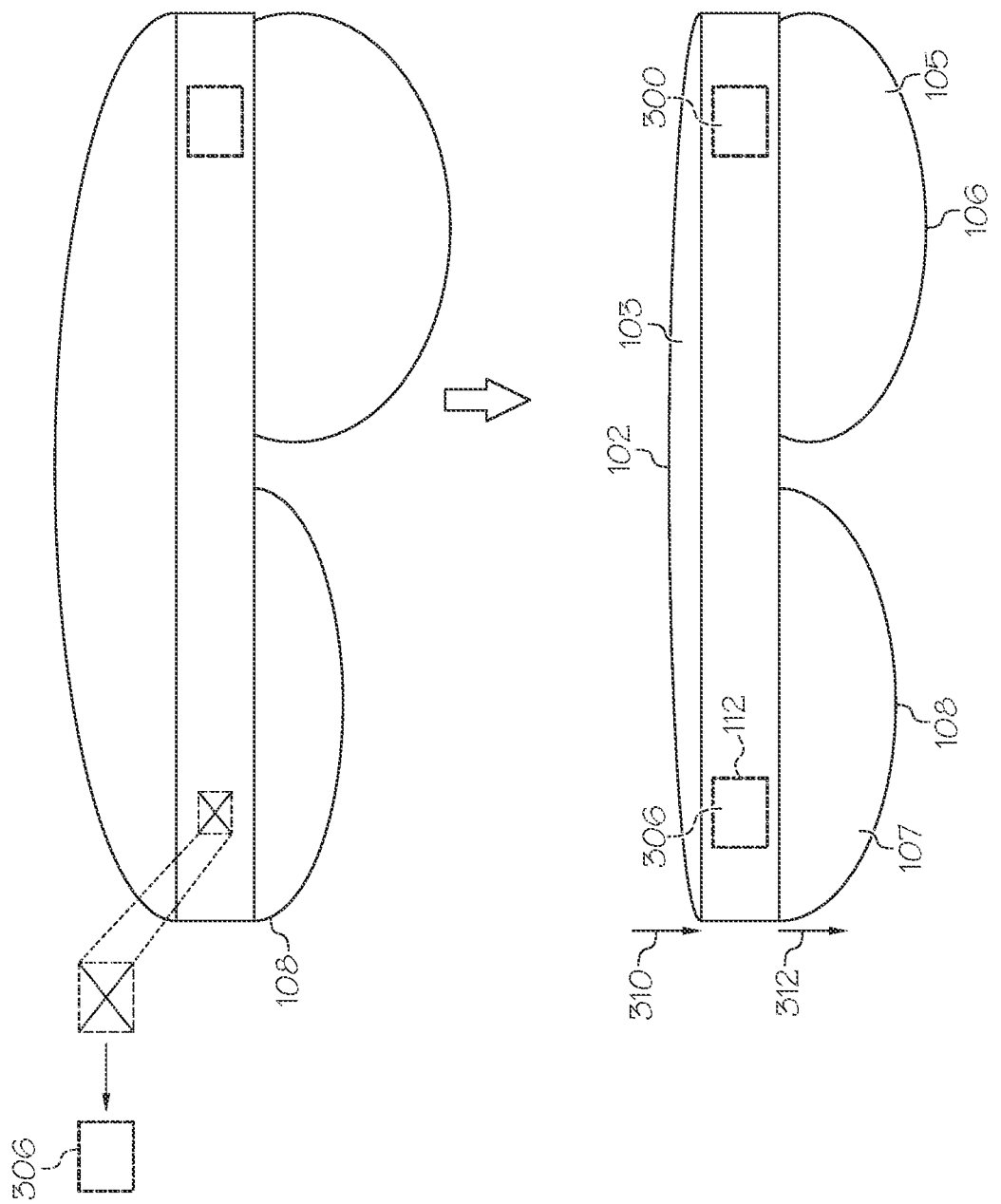
FIG. 3B depicts an example operation of the deformable sensor rigidity control system in which an operation status of an additional valve member is altered and an example result of the operation of the deformable sensor rigidity control system in which an operation status of the additional valve member is altered, according to one or more embodiments described and illustrated here.

FIG. 3B depicts an example operation of the deformable sensor rigidity control system 100 in which an operation status of an additional valve member 112 is altered and an example result of the operation of the deformable sensor rigidity control system 100 in which an operation status of the additional valve member 112 is altered, according to one or more embodiments described and illustrated here. Specifically, in FIG. 3B, a position or orientation of the additional valve member 112 is altered from a closed position to an open position 306. In embodiments, the computing device 114 may communicate instructions to the deformable sensor 101 so as to control the operation status of the additional valve member 112, e.g., change an operation status from a closed position to the open position 306. Additionally, due to fluid coupling between the cavities of the first deformable member 102 and the third deformable member 108, a certain additional volume of the medium present in the first deformable member 102 may disperse from the first cavity 103 defined by the first deformable member 102 to the third cavity 107 defined by third deformable member 108, thereby resulting in a further reduction in the pressure within the first deformable member 102. It is also noted that the status of additional valve member 112 may be altered manually.

In this way, the rigidity level of the first deformable member 102 may be further altered in real time. It is noted that the first cavity 103 defined by first deformable member 102 is fluidly coupled to the third cavity 107 defined by the second deformable member 106 via, e.g., another valve component that may be positioned with an additional aperture disposed on the rigid component 104. In embodiments, the additional valve component may be manually moved from one position to another relative to the additional aperture. Alternatively, in another embodiment, the additional valve component may be moved from one position to another relative to the additional aperture automatically, e.g., based on instructions received from the computing device 114.

Additionally, in embodiments, as a result of the operation status of the additional valve member 112 from a closed position to an open position 306, the size of the first deformable member 102 may be further reduced, e.g., by a level of 310. Additionally, the size of the third deformable member 108 may be expanded by a level of 312. It is noted that an additional part of the medium present within the first deformable member 102 disperses from the first cavity 103 defined by the first deformable member 102 to the third cavity 107 defined by the third deformable member 108 via an additional aperture positioned on the rigid component 104.

In operation, in an closed position of the additional valve member 112 (e.g., closed operation status), the additional aperture may be sealed or plugged (e.g., by another valve component) and may fail to facilitate any dispersal of air between the first cavity 103 and the third cavity 107 defined by the first deformable member 102 and the third deformable member 108, respectively. In contrast, in the open position 306 of the additional valve member 112 (e.g., open operation status), the additional aperture may not be sealed or plugged, and as such, an additional part of the medium present in the first deformable member 102 may disperse, via the first cavity 103, to the third cavity 107 defined by the third deformable member 108. The dispersed medium results in an expansion of the third deformable member 108 and causes an additional reduction in the rigidity level of the first deformable member 102 by, e.g., 20%, 25%, 30%, etc. This rigidity reduction results in a new rigidity level for the first deformable member 102 (e.g., a third rigidity value) that is lower than the second rigidity level described above. As previously stated, the variation in the rigidity level of the first deformable member 102 may be based on the material composition and/or dimensions of the first deformable member 102 and the third deformable member 108.

Figure 4:
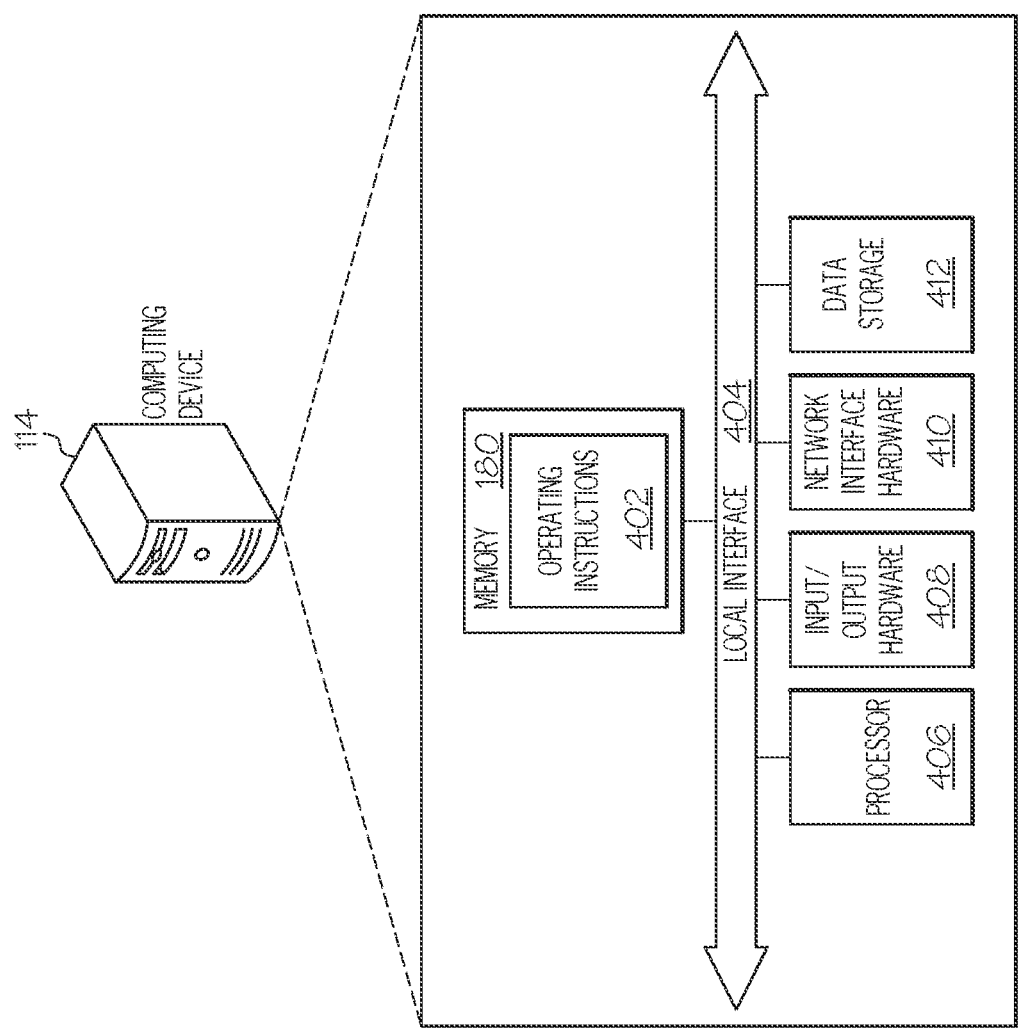
FIG. 4 depicts a non-limiting example of a computing device that may be communicatively coupled to or installed as part of the deformable sensor of the present disclosure, according to one or more embodiments described and illustrated herein.

FIG. 4 depicts a non-limiting example of a computing device 114 that may be communicatively to or installed as part of the deformable sensor 101 of the present disclosure, according to one or more embodiments described and illustrated herein. As illustrated, the computing device 114 includes a processor 406, input/output hardware 408, a network interface hardware 410, a data storage component 412, and a memory component 180. The memory component 180. The memory component 180 may be configured as volatile and/or nonvolatile memory and as such, may include random access memory (including SRAM, DRAM, and/or other types of RAM), flash memory, secure digital (SD) memory, registers, compact discs (CD), digital versatile discs (DVD) (whether local or cloud-based), and/or other types of non-transitory computer-readable medium. Depending on the particular embodiment, these non-transitory computer-readable media may reside within the computing device 114 and/or a device that is external to the computing device 114.

Instructions 402 may be stored in the memory component 180, which may be embodied as a computer program, firmware, and so forth. A local interface 404 is also included in FIG. 4 and may be implemented as a bus or other communication interface to facilitate communication among the components of the computing device 114.

The processor 406 may include any processing component operable to receive and execute instructions 402 (such as from a data storage component 436 and/or the memory component 180). As described above, the input/output hardware 408 may include and/or be configured to interface with speakers, microphones, and/or other input/output components.

The instructions 402 may include an operating system and/or other software for managing components of the computing device 114. It should be understood that while the component in FIG. 4 are illustrated as residing within the computing device 114, this is merely an example. In some embodiments, one or more of the components may reside external to the computing device 114 or within other devices. It should be understood that, while the computing device 114 is illustrated as a single device, this is also merely an example.

As an example, one or more of the functionalities and/or components described herein may be provided by the computing device 114. Depending on the particular embodiments, any of these device may have similar components as those depicted in FIG. 4. To this end, any of these devices may include instructions for performing the functionality described herein.

It should be understood that certain embodiments described herein are directed to a deformable sensor comprising a first deformable member defining a first cavity configured to be filled with a medium, a second deformable member defining a second cavity, a rigid component disposed between the first deformable member and the second deformable member such that the first deformable member is positioned on a first portion of the rigid component and the second deformable member is positioned on a second portion of the rigid component, the rigid component including an aperture disposed thereon, and a valve member configured to fluidly couple the first cavity of the first deformable member to the second cavity of the second deformable member via the aperture. The first deformable member has a first rigidity value when the valve member is configured in a first orientation, and a second rigidity value when the valve member is configured in the second orientation.

The terminology used herein is for the purpose of describing particular aspects only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. The term "or a combination thereof" means a combination including at least one of the foregoing elements.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:
1. A deformable sensor comprising:
a first deformable member defining a first cavity configured to be filled with a medium;
a second deformable member defining a second cavity;
a rigid component disposed between the first deformable member and the second deformable member such that the first deformable member is positioned on a first portion of the rigid component and the second deformable member is positioned on a second portion of the rigid component, the rigid component including an aperture disposed thereon; and a valve member configured to fluidly couple the first cavity of the first deformable member to the second cavity of the second deformable member via the aperture, the valve member configurable in a first orientation and a second orientation,
    the first deformable member having a first rigidity value when the valve member is configured in the first orientation, and
    the first deformable member having a second rigidity value when the valve member is configured in the second orientation, the second rigidity value is based on a part of the medium dispersing from the first cavity of the first deformable member to the second cavity of the second deformable member.

2. The deformable sensor of claim 1, wherein the first orientation of the valve member corresponds to a closed operation status.

3. The deformable sensor of claim 1, wherein the second orientation corresponds to an open operation status.

4. The deformable sensor of claim 1, wherein the first rigidity value is higher than the second rigidity value.

5. The deformable sensor of claim 1, further comprising a third deformable member that is positioned on a third portion of the rigid component and defining a third cavity.

6. The deformable sensor of claim 5, wherein a volume of the first deformable member is larger than an additional volume of the third deformable member.

7. The deformable sensor of claim 5, further comprising an additional valve member that is positioned in the rigid component and configured to fluidly couple the first deformable member to the second deformable member via an additional aperture disposed on the rigid component, the additional valve member is configuration in the first orientation and the second orientation.

8. The deformable sensor of claim 7, wherein the first deformable member having a third rigidity value when the additional valve member is configured in the second orientation.

9. The deformable sensor of claim 8, wherein the third rigidity value is based on an additional part of the medium dispersing from the first deformable member to the third deformable member responsive to the additional valve member being configured in the second orientation.

10. The deformable sensor of claim 1, wherein a volume of the first deformable member is larger than an additional volume of the second deformable member.

11. The deformable sensor of claim 1, wherein the medium is air.

12. A deformable sensor comprising:
    a first deformable member defining a first cavity configured to be filled with a medium;
    a second deformable member defining a second cavity;
    a third deformable member defining a third cavity;
    a rigid component disposed such that the first deformable member is positioned on a first portion of the rigid component, the second deformable member is positioned on a second portion of the rigid component, and the third deformable member is positioned on a third portion of the rigid component, the rigid component including an aperture and an additional aperture disposed thereon;
    a valve member configured to fluidly couple the first cavity of the first deformable member to the second cavity of the second deformable member via the aperture, the valve member configurable in a first orientation and a second orientation,
        the first deformable member having a first rigidity value when the valve member is configured in the first orientation,
        the first deformable member having a second rigidity value when the valve member is configured in the second orientation, the second rigidity value is based on a part of the medium dispersing from the first deformable member to the second deformable member; and
    an additional valve member configured to fluidly couple the first cavity of the first deformable member to the third cavity of the third deformable member via the additional aperture, the additional valve member configurable in the first orientation and the second orientation,
    the first deformable member having a third rigidity value when the additional valve member is configured in the second orientation, the third rigidity value is based on an additional part of the medium dispersing from the first cavity of the first deformable member to the third cavity of the third deformable member.

13. The deformable sensor of claim 12, wherein the first orientation of the valve member corresponds to a closed operation status.

14. The deformable sensor of claim 12, wherein the second orientation corresponds to an open operation status.

15. The deformable sensor of claim 12, wherein a volume of the first deformable member is larger than an additional volume of the third deformable member.

16. The deformable sensor of claim 12, wherein a volume of the first deformable member is larger than an additional volume of the second deformable member.

17. The deformable sensor of claim 12, wherein the medium is air.

18. The deformable sensor of claim 12, wherein the first rigidity value is larger than the second rigidity value.

19. The deformable sensor of claim 12, wherein the first rigidity value is larger than the third rigidity value.

20. The deformable sensor of claim 12, wherein the medium is water.

* * * * *